Figure 1:
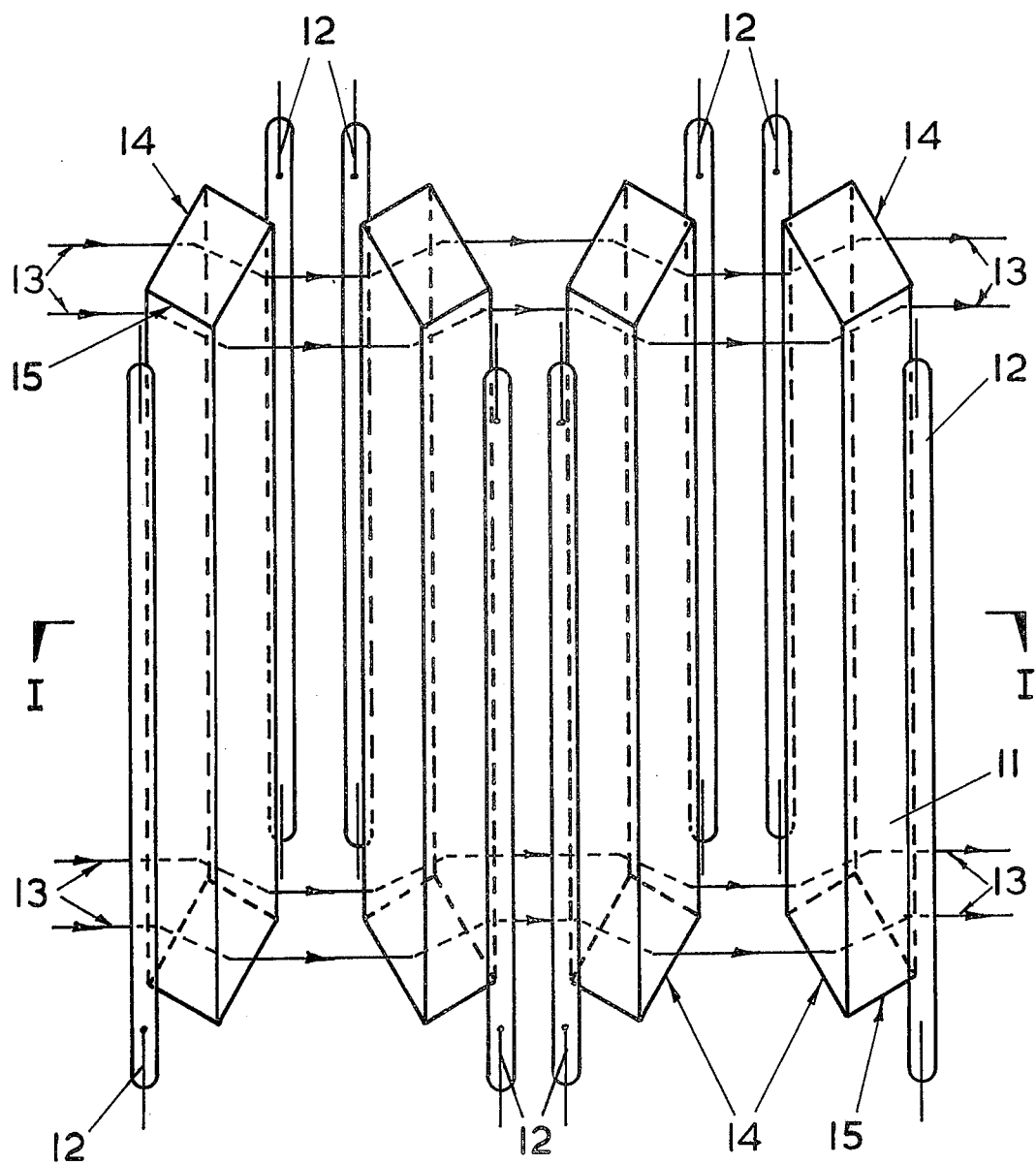

United States Patent [19]
Hughes

[11] 3,928,811
[45] Dec. 23, 1975

[54] LASER AMPLIFIER

[75] Inventor: John Leonard Hughes, Aranda, Australia

[73] Assignee: Quentron Optics Pty Ltd, Adelaide, Australia

[22] Filed: Feb. 6, 1974

[21] Appl. No.: 439,920

[30] Foreign Application Priority Data
Feb. 9, 1973 Australia.............................. 2210/73

[52] U.S. Cl........... 330/4.3; 331/94.5 F; 331/94.5 D
[51] Int. Cl.²......................... H01S 3/02; H01S 3/05
[58] Field of Search..... 330/4.3; 331/94.5 D, 94.5 F

[56] References Cited
UNITED STATES PATENTS

| | | | |
|---|---|---|---|
| 3,423,696 | 1/1969 | Chernoch | 331/94.5 P |
| 3,423,697 | 1/1969 | Chernoch | 331/94.5 P |
| 3,500,231 | 3/1970 | Tomiyasu et al. | 331/94.5 F |
| 3,621,456 | 11/1971 | Young | 331/94.5 E |
| 3,631,362 | 12/1971 | Almasi | 331/94.5 C |
| 3,794,929 | 2/1974 | Carr | 330/4.3 |

OTHER PUBLICATIONS

Nuckolls et al., "Laser Compression . . . Thermonuclear Applications," Sept. 15, 1972, pp. 139–142, Nature, Vol. 239.

*Primary Examiner*—T. H. Tubbesing
*Assistant Examiner*—N. Moskowitz

[57] ABSTRACT

A laser amplifier structure with the amplifying medium in the form of one or more, appropriately excited, orientated and fashioned, elongated slab segments. The laser radiation enters and leaves each of the slab segments via respective, adjacent polished faces which are parallel to the longest axis of each slab. A single laser beam or a sequence of laser beams equivalent to such a beam can be amplified.

8 Claims, 4 Drawing Figures

LASER AMPLIFIER

BACKGROUND OF THE INVENTION

A laser (light amplification by the stimulated emission of radiation) amplifier is a well-known device for increasing the amount of laser radiation energy and power for a wide variety of uses. Such a device consists essentially of a medium whose constituents, be they atoms, molecules, ions or particles can be appropriately excited to a state where laser radiation of a particular wavelength passing through such an excited medium can undergo amplification via the stimulated emission of radiation.

An increasing number of media are being proven suitable as laser amplifier media, over an increasing range of wavelengths, when excited using various techniques such as optical excitation, electrical excitation, thermal excitation, chemical excitation and also electron beam excitation. Techniques for exciting the laser medium away from the region where the laser action takes place and transporting the excited medium to this locality are being developed in the form of the gas dynamic laser and this approach promises to considerably reduce the difficulties that arise in high power laser systems when both the excitation and lasing actions take place in the same locality of the system.

Common to all laser media and excitation techniques developed to date is the considerable care required to ensure that the laser amplifier system is used under the most productive conditions possible without introducing detrimental effects either to the laser beam undergoing amplification or to the medium itself. New concepts and techniques such as those which characterise the present invention are required to provide much more latitude with the operating parameters of powerful and energetic laser amplifiers now urgently required for an increasing number of tasks over a broad spectrum of applications ranging from those in industry to those in scientific research.

The first laser amplifier medium proposed was a rod of synthetic ruby. The problems associated with such cylindrical amplifiers are well known in the art and although such problems vary depending on whether the laser amplifying medium is solid, liquid or gaseous, they always exist particularly when the laser beam parameters are at or near the diffraction limit and the laser pulse or beam is amplified to high energy and/or high power levels. Under such conditions the cylindrical laser amplifier medium can exhibit non-uniformities which can lead to severe beam distortions and depolarization. Under such conditions the medium can also be damaged due to non-linear optical effects leading to self-focussing of the laser beam within the amplifying medium, an effect which is particularly disastrous in the case of large cylindrical amplifier media such as neodymium doped glass rods, resulting in a row of bubbles along the rod axis if even more severe damage does not occur in the process.

Considering the defects of cylindrical laser amplifier media in terms of solid rods of ruby or neodymium doped glass, they arise because:

a. It is difficult, if not impossible, to uniformly excite a rod laser medium, particularly when the diameter of the rod is increased to many centimeters (for example 5 to 10 cms as is the case with neodymium doped glass rod amplifiers). This difficulty of uniformly exciting the laser amplifier medium results in both optical and thermal distortions of the medium which subsequently affects the quality of the amplified laser beam.

b. As the peak power of the laser pulse or beam being amplified is increased, the probability of damaging the whole or part of the laser amplifier rod via the self-focussed collapse of the whole or part of the beam increases.

c. Due to extreme difficulties with uniformly exciting and producing large rod laser amplifiers, for example about one meter long and 5 to 10 cms in diameter, with the required gain, the total area of the output aperture of a practical rod laser amplifier is relatively small. Because the laser radiation loading per unit area is limited due to surface and bulk damage to the medium, it follows that the total output pulse energy (power) available from a practical laser rod amplifier is also relatively small. Similar comments also apply to both liquid and gaseous laser media contained in rod-like cylinders.

Limitations experienced with laser amplifier media of cylindrical configuration led to the development of segmented rod laser amplifiers in an effort to overcome the fundamental problems referred to above. This trend eventually led to the present day disc laser amplifiers where the laser amplifying medium is composed of one or more discs. Such disc amplifiers allow for more uniform excitation and cooling of the laser amplifier medium. Another major advantage of the disc laser amplifier is the fact that the area of the output aperture of such a system can be made much larger than that of the largest practical rod laser amplifier. A further major advantage of disc laser amplifiers over rod amplifiers is the fact that the individual discs can be spread out to such an extent that any self-focussing trend can be limited to one disc, the self-focussed laser beam having diverged by natural divergence before entering the following disc. It is also a simpler process to follow the profile of a diverging laser beam in a disc laser amplifier than it is in a cylindrical rod amplifier and this fact has led to conical rod amplifiers as an alternative to disc laser amplifiers. It has been proposed that if the laser beam to be amplified is diverged sufficiently then the natural divergence will compensate for any tendency for the beam to self-focus during passage through the laser amplifier medium.

The main disadvantages of disc laser amplifiers compared with cylindrical rod laser amplifiers are:

d. The excitation sources such as flash lamps and photo emitting diodes cannot be as closely coupled to a disc laser amplifier as they can to a cylindrical rod laser amplifier.

e. The discs must be excited via their optically polished surfaces which makes them highly susceptible to damage by explosive fragments if the source of excitation explodes.

f. Large, near parallel optically polished surfaces of discs are more prone to maintain parasitic oscillators which deplete the laser amplifier media of stored energy prior to the passage of the laser pulse or beam to be amplified, particularly since the doping level of discs can be much higher than that in rods.

SUMMARY OF THE INVENTION

It is an object of the present invention to provide a laser amplifier which overcomes defects of rod laser amplifiers and yet maintains most of the advantages of both rod and disc laser amplifier systems.

It is a further object of the invention to provide a laser amplifier of simple construction which is easily excited from close coupled excitation sources and yet exhibits relatively large output aperture area.

A still further object of the invention is to provide a laser amplifier which can amplify a single laser beam, more than one laser beam, a diffraction limited laser beam or a divergent laser beam by means of one or more passages through the amplifying medium in either the same direction or in opposite directions.

A still further object of the invention is to provide a laser amplifier utilizing a laser medium in solid, liquid, gaseous, particle or plasma phase, or a mixture of one or more of these phases.

According to this invention there is provided a laser amplifying medium in the form of one or more elongated slabs of laser medium or one or more elongated slab-like containers containing a liquid, gaseous, or plasma laser medium, said slab, or slab-like container being elongated along an axis along which the laser radiation undergoing amplification does not propagate.

On the one hand the elongated laser slab (or slab-like container) may be thought of as a section of a laser disc (or disc-like container) or on the other hand such an elongated laser slab (or slab-like container) may be thought of as a laser rod with two sides rather than two ends optically polished. The laser pulse or beam enters and leaves the slab (or slab-like container) through the optically polished sides of the slab rather than via its ends as would correspond to a conventional rod amplifier. Therefore, in the present invention, the laser beam is not amplified in a direction parallel to the long axis of the slab (or slab-like container), the maximum deviation of the beam direction from a direction perpendicular to the long axis of the slab (or slab-like container) being the Brewster angle or such a departure (few degrees) in excess of the Brewster angle that the losses incurred are not detrimental to the operation of the slab laser amplifier as a whole.

The slab laser amplifier medium of the invention may be static or mobile without affecting the lasing action and can be excited via closely or loosely coupled excitation sources either in the vicinity or away from the vicinity where the lasing action takes place with the slab laser amplifier.

To facilitate an understanding of the invention, the following description will refer to a solid slab medium. However, it will be understood that the slab may comprise a container having a liquid, gaseous or plasma medium, as known in the art.

In a preferred form of the invention within the present state of laser technology, the laser medium is a neodymium doped glass slab up to about 1 meter long, of square or rectangular cross-section having two oppositely optically polished sides, parallel to the long axis of the slab, being of between about 2 to 10 cms wide. The other two sides are not optically polished and are of dimentions of between about 2 to 5 cms wide. In another form of the invention using crystalline laser media such as ruby or neodymium doped yttrium aluminium garnet, the length of the slab may be up to about 15 to 30 cms long and ground to the above mentioned square or rectangular configuration with sides up to about 2.5 cms wide. Generally the two unpolished sides and both ends of the slab should be such as to allow uniform excitation of the medium and of a quality sufficient to allow coating, where desired, with appropriate antireflection or filtering material.

It is an advantage of the laser amplifier of the invention utilizing neodymium doped glass or crystals that sources of excitation energy, such as flash lamps or photo emitting diodes, may be closely coupled to the laser medium leading to higher excitation efficiency than would be the case with loosely coupled sources. Under these conditions, as is the situation with rod lasers, the excitation of the laser medium is not effected by means of the expensively polished optically flat surfaces. However, the uniformity of the excitation process is more representative of disc rather than rod laser media.

A further advantage of the amplifier of this invention is that if there should be an explosion emanating from the closely coupled excitation sources, such as flashlamps and photoemitting diodes, then it is unlikely that the optically polished surfaces of the slabs will be damaged, as would be the case with loosely coupled excitation sources, since exploding material will strike only the non-optically polished surfaces.

In the case where the flash lamps or photoemitting diodes are not closely coupled to the slabs, it is necessary to fully protect the optically polished surfaces from any detrimental effects of either an explosion emanating from the excitation source itself or the excitation radiation itself.

Further understanding of the invention will be apparent from consideration of the accompanying drawings which are diagrammatic representations of preferred embodiments of the inventions and are not intended to be restrictive of the scope of the invention.

Figure 2:
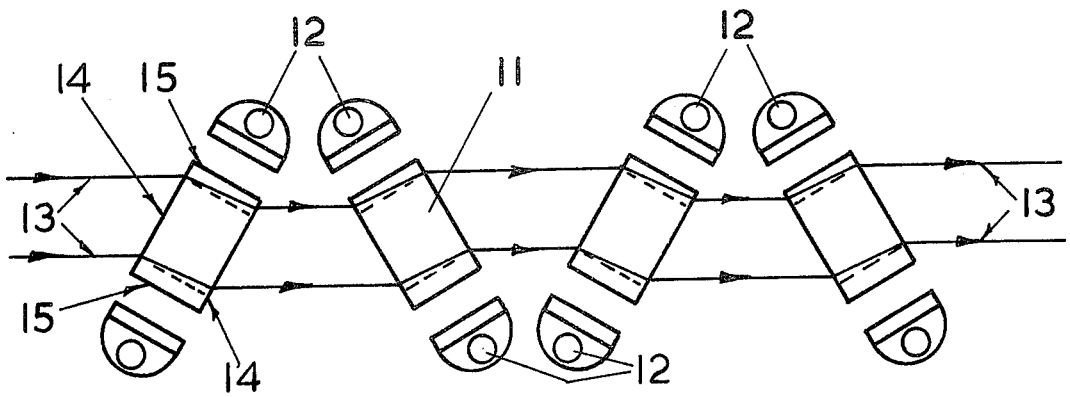
Figure 3:
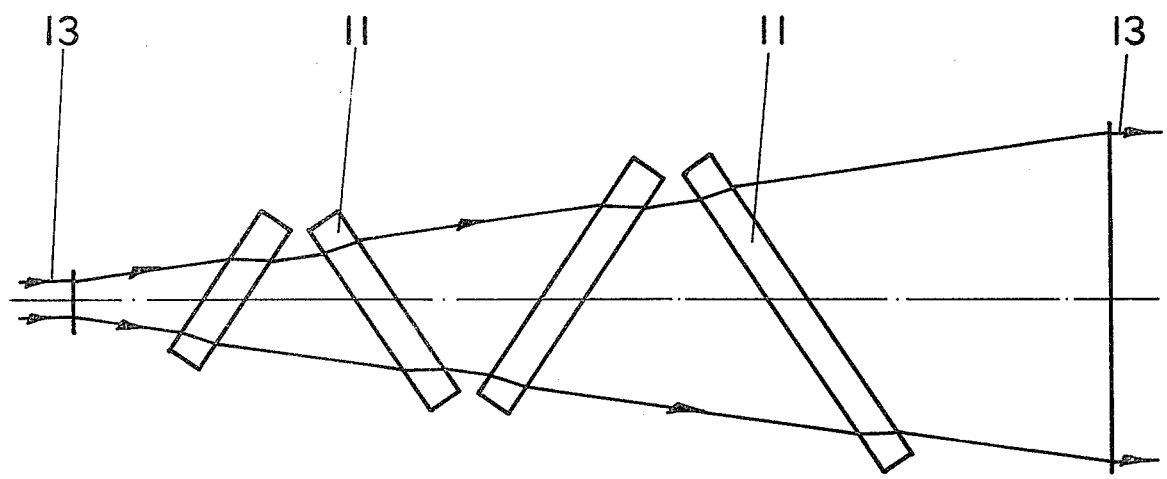
Figure 4:
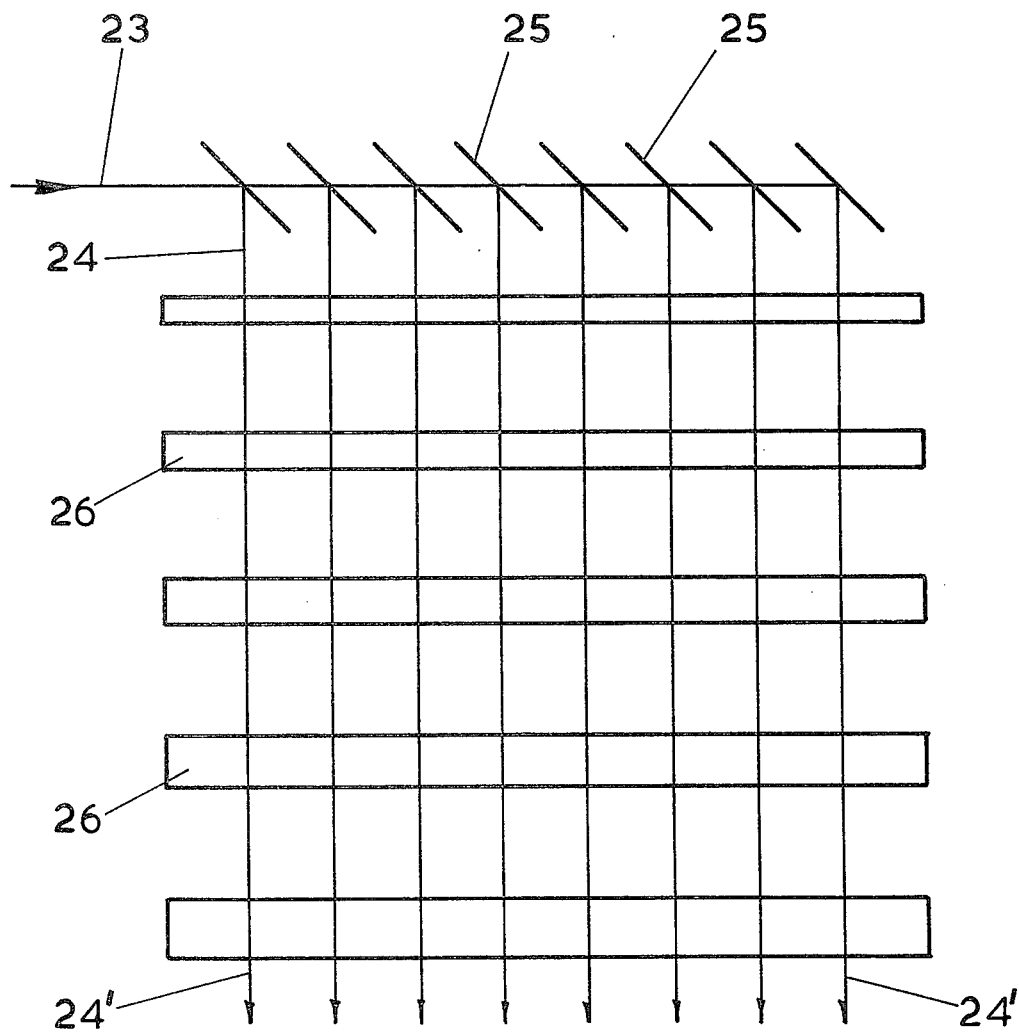

FIG. 1 is a diagrammatic perspective view of an aircooled laser amplifier according to the invention, FIG. 2 is a sectional plan view of the amplifier diagrammatically illustrated in FIG. 1, taken along the lines I—I of FIG. 1, FIG. 3 is a diagrammatic representation of a second form of laser amplifier according to the invention, and FIG. 4 is a diagrammatic representation of a further form of an amplifier of the invention.

Referring to FIGS. 1 and 2, the laser amplifier illustrated comprises four rectangular sectioned elongated slabs 11 having two opposed optically polished side surfaces 14, and unpolished sides 15 and unpolished ends 16. The slabs 11 are each formed of neodymium doped glass and they are disposed with their longitudinal axis substantially parallel.

Each slab 11 has an excitation source consisting of a pair of flash lamps 12 adjacent each of the side surfaces 15. Adjacent polished side surfaces 14 of adjacent slabs 11 are angled with respect to each other at Brewster's angle so that a laser beam 13 entering the left hand slab, as indicated, passes through the slab array and leaves the right hand slab at 13' substantially parallel to the beam 13. The beam 13 passing through the amplifier may be diffraction limited, less than one milliradian for neodymium glass lasers developed to date, or diverging up to several milliradians, for example, to a laser beam divergence where it becomes impractical to correct for the severe optical distortions inherent in such amplified laser beams.

The laser amplifier of FIGS. 1 and 2 may be aircooled or, if desired, conventional techniques for liquid cooling may be employed. These may involve immersion of substantially the whole or part of the slabs 11 in a cooling liquid medium.

If desired instead of orientating the slabs as shown in FIG. 1 the slabs 11 may be orientated with their longitudinal axes angled to the vertical as shown in FIG. 3. With this arrangement the laser beam 23 enters the first slab 11 at Brewster's angle to minimise losses or at other angles to minimise reflections along the path of the laser beam, normally a few degrees off the direction of the laser beam.

The embodiment of the invention illustrated in FIG. 3 utilizes slabs 11 of the same or similar configuration to those shown in FIG. 1. These slabs preferably have the width of the polished surfaces greater than the slab thickness. The slabs 11 are made progressively longer towards the output end of the amplifier (the right hand end of FIG. 3) so that, with this configuration, the ends of the slabs 11 generally follow the profile of the normally diverging laser beam 13. Under these conditions the thickness of the slabs may become progressively less than their width as their length increases.

The slabs of this embodiment are normally excited by close coupled flash lamps or photo emitting diodes (not shown) adjacent the unpolished side surfaces of each slab. However, if the slab thickness varies with increase in slab length, loosely coupled force pumping, that is excitation by means of the optically polished surfaces, would be necessary.

Further for short pulse amplification, that is, laser pulses of nanoseconds ($10^{-9}$ seconds) duration or less, the thickness of the slab will in general be less than its width to minimise possible damage due to self-focussing. However, close coupled excitation will be possible under those conditions when using diffraction limited or near diffraction limited laser beams. In all cases the length of the slab will be much greater than either its width or its thickness.

Referring to FIG. 4, the laser amplifier of the present invention can be used to amplify one or more laser beams in the manner required for producing, for example, fusion reactions in both compressed and uncompressed targets, as well as possible thermonuclear fusion in compressed targets. When using the invention to amplify a single laser beam in a multi-pass mode it is preferable to ensure that the input beam is as near to a square or rectangular cross-section as possible in order to derive maximum utilization of the invention. When using the invention to amplify more than one laser beam either simultaneously or in a random or fixed sequence, than an apparatus of the type illustrated in FIG. 4 can be used.

In this arrangement the incoming laser beam 23 can be of circular cross-section and it is split up into a number of separate beams 24 by a series of beamsplitters 25. Each new portion 24 of the beam can then be amplified either simultaneously or in a fixed sequence with a fixed delay between the time each portion 24 of the beam passes through the slabs 26 and undergoes amplification.

The beams 24' emerging from the amplifier in the manner depicted in FIG. 4 can be used either together or separately depending on the particular application involved.

Excitation of the slabs 26 may be carried out in the manner previously described, the slabs may be substantially parallel, or they may be angled relative to each other as described with reference to the previous embodiments.

The fixed sequence in time can either be maintained after amplification or brought back into coincidence by another series of beamsplitters and reflectors to produce a single beam or beam pulse.

One particularly important application of a series of amplified laser beams is the generation of coherent X-rays for use in non-linear optical studies. The target involved in the generation of coherent X-rays may be sequentially excited to produce a travelling wave type amplifier for the generation and amplification of coherent X-rays.

The invention has particular application for target ranging and the amplifier may take the form shown in FIGS. 1 and 2 or the form shown in FIG. 3 where the highest possible laser power was required.

Used in this manner the invention can produce much higher output powers and energy than conventional rod laser amplifiers operating at the same loading per unit area of the output aperture for the simple reason that the sides rather than the ends of the rod (in slab form) are used.

For the highest power levels the same may be true when the present invention is compared with a disc laser. Whilst the present invention has an output aperture area less than a disc amplifier whose output aperture diameter is equal to the length of the slabs, there are practical limitations in manufacturing discs of large diameters of the required quality so that, in practice, slab amplifiers may be made with longer output areas than disc lasers and yet have the highest possible quality due to relatively less difficulty of manufacture. In many industrial applications such as cutting materials of considerable length or width, a series of slabs could be laid end to end with a thin optically opaque sheet inserted between the ends of the slabs to cut self oscillation along the long series of slabs. In this way a very long, large effective aperture composite slab would result.

The limit on the length of the individual slabs will be set either by parasitic oscillations or production difficulties. It should be noted that the slab medium being a compromise between rod and disc media will also be a compromise regarding the self-oscillation of the medium. The techniques effective (e.g., samarium doped glass cladding) for the supression of self-oscillation in rod and disc media apply equally to the slab media of the present invention.

It should be mentioned that the present invention has further application in laser-controlled thermonuclear fusion research, studying non-linear optics and in laser ranging to targets such as military targets and earth satellite targets. These aforementioned applications are not intended to shadow the usefulness of the invention in industrial processes such as laser welding, laser cutting and laser drilling.

As stated previously, the slab of laser medium may be constructed as a solid slab or constructed in such a manner to behave like a slab-like container into which the laser medium in fluid form can be circulated during operation of the amplifier. Excitation of the medium may then be carried out remote from the slabs and pumped or otherwise fed to the slab container. Remote cooling of the medium may also be carried out. The best fluid media are dye lasers and iodine.

With a solid slab, remote excitation may be carried out using flash lamps, light emitting diodes or the like, the light being conveyed to the slab by means of light pipes.

The thickness of the solid slab is generally limited by considerations of cooling difficulties, particularly when the slab is constructed of a poor conducting medium such as glass. Also, self-focussing effect of the laser beam restrict the slab thickness.

On the other hand the thickness of the slab must not be too small otherwise the slab becomes too fragile for reliable operation.

I claim:

1. An elongated rectangular slab-shaped laser amplifier device having one pair of opposite side surfaces which are optically polished, said optically polished side surfaces being parallel to the longitudinal axis of the slab, with all other surfaces being optically unpolished, and means for introducing excitation radiation through said unpolished side surfaces with said device adapted to eliminate laser radiation and excitation through said unpolished end surfaces.

2. A laser medium amplifying device as claimed in claim 1 particularly adapted to amplify a sequence of non-overlapping laser beams having circular or near circular cross-section.

3. A laser medium amplifying device as claimed in claim 1 wherein the dimensions of length, width and thickness of the individual slab segments are varied in such a manner as to accommodate the amplification of a divergent laser beam, or sequence of such laser beams.

4. A laser medium amplifying device as claimed in claim 1 comprising means for passing a a plurality of non-overlapping laser beams each of circular or near circular cross section into the device with a time sequence between the beams appropriate to the realization of a travelling wave output with a time gradient.

5. A laser medium amplifying device as claimed in claim 1 wherein the medium is composed of neodymium doped glass.

6. A laser medium amplifying device as claimed in claim 1 wherein the medium is ruby.

7. A laser medium amplifying device as claimed in claim 1 wherein the laser medium is neodumium doped yttrium aluminium garnet.

8. A gaseous laser medium amplifying device as claimed in claim 1 wherein the said elongated slab comprises a container holding iodine as the laser medium.

* * * * *